(12) United States Patent
Zeppenfeld et al.

(10) Patent No.: US 7,162,421 B1
(45) Date of Patent: Jan. 9, 2007

(54) DYNAMIC BARGE-IN IN A SPEECH-RESPONSIVE SYSTEM

(75) Inventors: Torsten Zeppenfeld, Menlo Park, CA (US); Brian Strope, Palo Alto, CA (US); Su-Lin Wu, San Carlos, CA (US); Ben Shahshahani, Capitola, CA (US)

(73) Assignee: Nuance Communications, Burlington, MA (US)

( * ) Notice: Subject to any disclaimer, the term of this patent is extended or adjusted under 35 U.S.C. 154(b) by 758 days.

(21) Appl. No.: 10/140,526

(22) Filed: May 6, 2002

(51) Int. Cl.
*G10L 15/20* (2006.01)

(52) U.S. Cl. .................................................. 704/233

(58) Field of Classification Search ............... None
See application file for complete search history.

(56) References Cited

U.S. PATENT DOCUMENTS 5,675,707 A * 10/1997 Gorin et al. ............... 704/257
5,765,130 A * 6/1998 Nguyen ..................... 704/233
5,794,193 A * 8/1998 Gorin ........................ 704/250
6,574,601 B1 * 6/2003 Brown et al. ............. 704/270.1
6,651,043 B1 * 11/2003 Ammicht et al. .......... 704/275

OTHER PUBLICATIONS

McGlashan, S., et al., "Voice Extensible Markup Language (VoiceXML) Version 2.0," W3C Working Draft, Oct. 23, 2001, Table of Contents, pp. 1-4, Section 4.1.5 Barge-in, pp. 80-81. http://www.w3.org/TR/2001/WD-voicexml20-20011023/.
Rabiner, L., et al., "Fundamentals of Speech Recognition," 1993, pp. 143-149, PTR Prentice-Hall, Inc., Englewood Cliffs, New Jersey.

\* cited by examiner

*Primary Examiner*—Abul K. Azad
(74) *Attorney, Agent, or Firm*—Blakely, Sokoloff, Taylor & Zafman LLP

(57) ABSTRACT

A method and system for barge-in acknowledgement are disclosed. A prompt is attenuated upon detection of speech. The speech is accepted and the prompt is terminated if the speech corresponds to an allowable response.

20 Claims, 10 Drawing Sheets

DYNAMIC BARGE-IN IN A SPEECH-RESPONSIVE SYSTEM

FIELD OF THE INVENTION

The present invention pertains to speech recognition technology. More particularly, the present invention relates to processing of barge-in, i.e. user's speech occurring during playing of prompts.

BACKGROUND OF THE INVENTION

Technological developments offer convenience and efficiency to variety of aspects of our lives. One of such technological development is automated phone systems, offering banking services, customer care services, etc. Some of the elaborate automated systems are capable of processing human voice, thus enhancing features of the automated phone systems by allowing users' responses not only to involve digits and short words capable of being entered using a phone key pad, but also to include complex phrases.

Users of the automated phone systems supporting voice recognition may understand what the system is expecting from them prior to the system finishing playing a prompt. Because time is valuable in our society many users, upon understanding the meaning of the prompt, will speak their choice without waiting for the end of the prompt. Thus, in order to better serve users, the elaborate automated phone systems are capable of processing voice responses made prior to the end of the prompt playing. This situation is known as "barge-in." In order to acknowledge the user's response, the current automated phone systems terminate the prompt immediately upon detecting the barge-in.

Due to the fact that the automated phone systems are not capable of distinguishing one human voice from the other or immediately determining the meaning of the speech, the system will terminate the current prompt upon detection of any speech or noise, which may be a statement made by a person located in the same room with the user. In addition, the user of the automated phone system may be conducting a conversation with another person while listening to the prompt, causing the automated phone system to detect the statement made by the user and terminate the prompt even though the statement was not directed to the automated phone system.

Termination of the prompt upon detection of any speech or noise may present certain problems. If the termination of the prompt occurs prior to the user understanding the meaning of the prompt, then the user will not be able to know what the system expects from him. In addition, the system will fail to interpret or will erroneously interpret the detected speech or noise, because the speech or noise was not directed to the automated phone system. This may cause the user to lose patience and hang up the phone, or experience delays while waiting for the system to recover, if the system has an ability to recover from such an error.

What is needed, therefore, is a solution which overcomes these and other shortcomings of the prior art.

SUMMARY OF THE INVENTION

A method and apparatus for barge-in acknowledgement in a speech recognition system are described. Upon detection of speech a prompt is attenuated. If the speech corresponds to an allowable response then the speech is accepted and the prompt is terminated.

BRIEF DESCRIPTION OF THE DRAWINGS

The present invention is illustrated by way of example and not limitation in the figures of the accompanying drawings, in which like references indicate similar elements and in which.

DETAILED DESCRIPTION

A method and apparatus including a dynamic barge-in technique for acknowledgement of a user's speech are described. Note that in this description, references to "one embodiment" or "an embodiment" mean that the feature being referred to is included in at least one embodiment of the present invention. Further, separate references to "one embodiment" in this description do not necessarily refer to the same embodiment; however, neither are such embodiments mutually exclusive, unless so stated and except as will be readily apparent to those skilled in the art. Thus, the present invention can include any variety of combinations and/or integrations of the embodiments described herein.

It will be appreciated that the term "speech" and "user's speech", as used herein, mean any speech, or noise occurring while a user is connected to a speech recognition system. It will also be appreciated that the term "utterance", as used herein, means a statement extracted from the speech.

Exemplary Architecture

Figure 1:
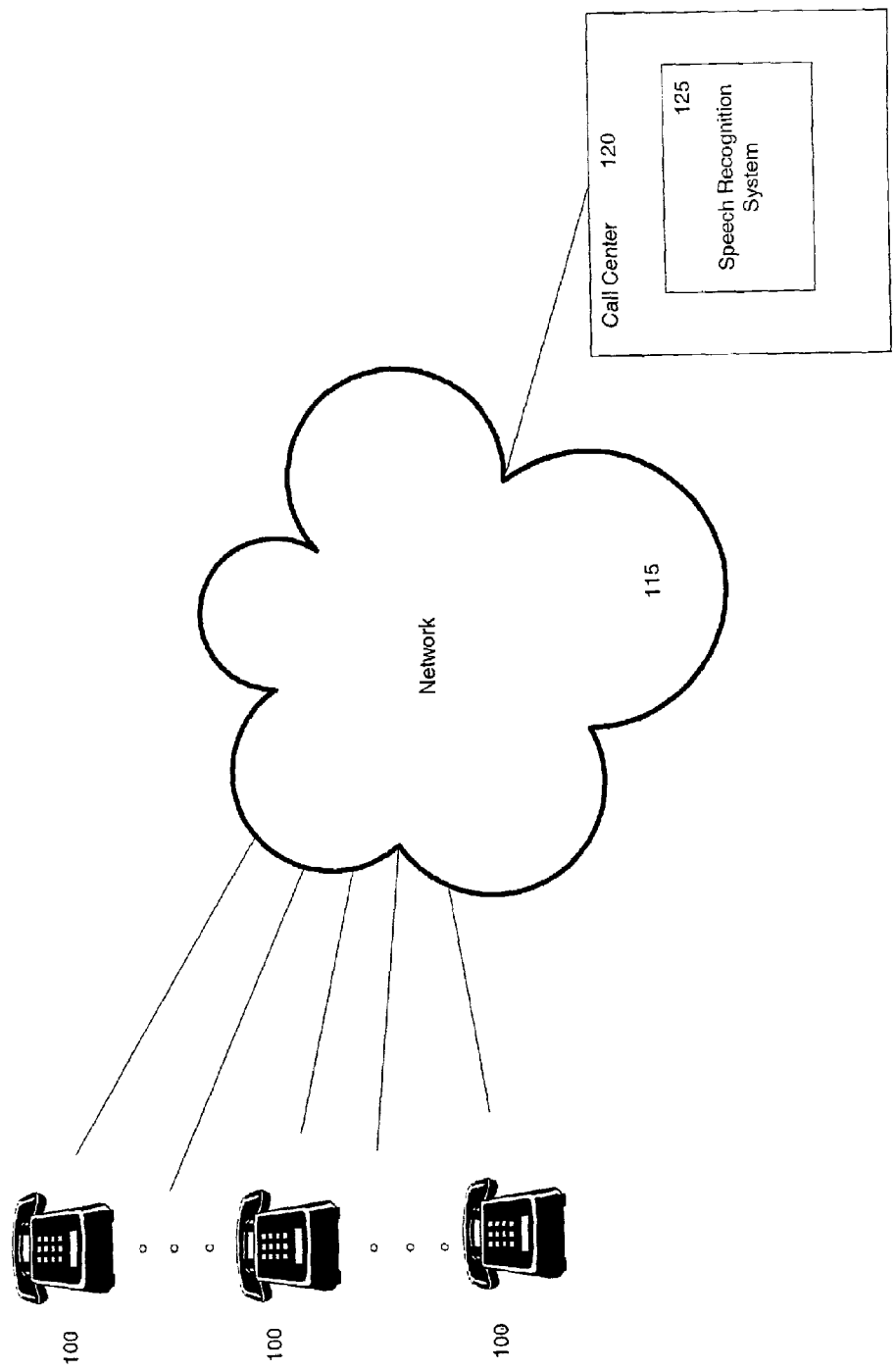
FIG. 1 illustrates an exemplary network architecture in which an embodiment of the present invention may be implemented.

FIG. 1 illustrates an example of a network architecture in which the dynamic barge-in technique can be implemented. The users may utilize connecting devices 100 to connect to a call center 120 via the network 115. The connecting devices 100 may be any devices providing a user with an ability to connect to the call center 120, for example, electrets, carbon button, hands free analog or digital telephones, cellular telephones, devices which use voice over IP (e.g., a personal computer), or other similar devices capable of transmitting and receiving voice. The connecting devices 100 may obtain access to the call center 120 via the network 115, which may be a Public Switched Telephone Network (PSTN), Local Area Network (LAN), the Internet, or other networks well known in the art or combination thereof. The call center 120 may be any facility providing services via an automated system, for example a bank providing automated banking services, or a medical office providing automated patient care services. In illustrated embodiment the call center 120 comprises a speech recognition system 125.

Figure 2:
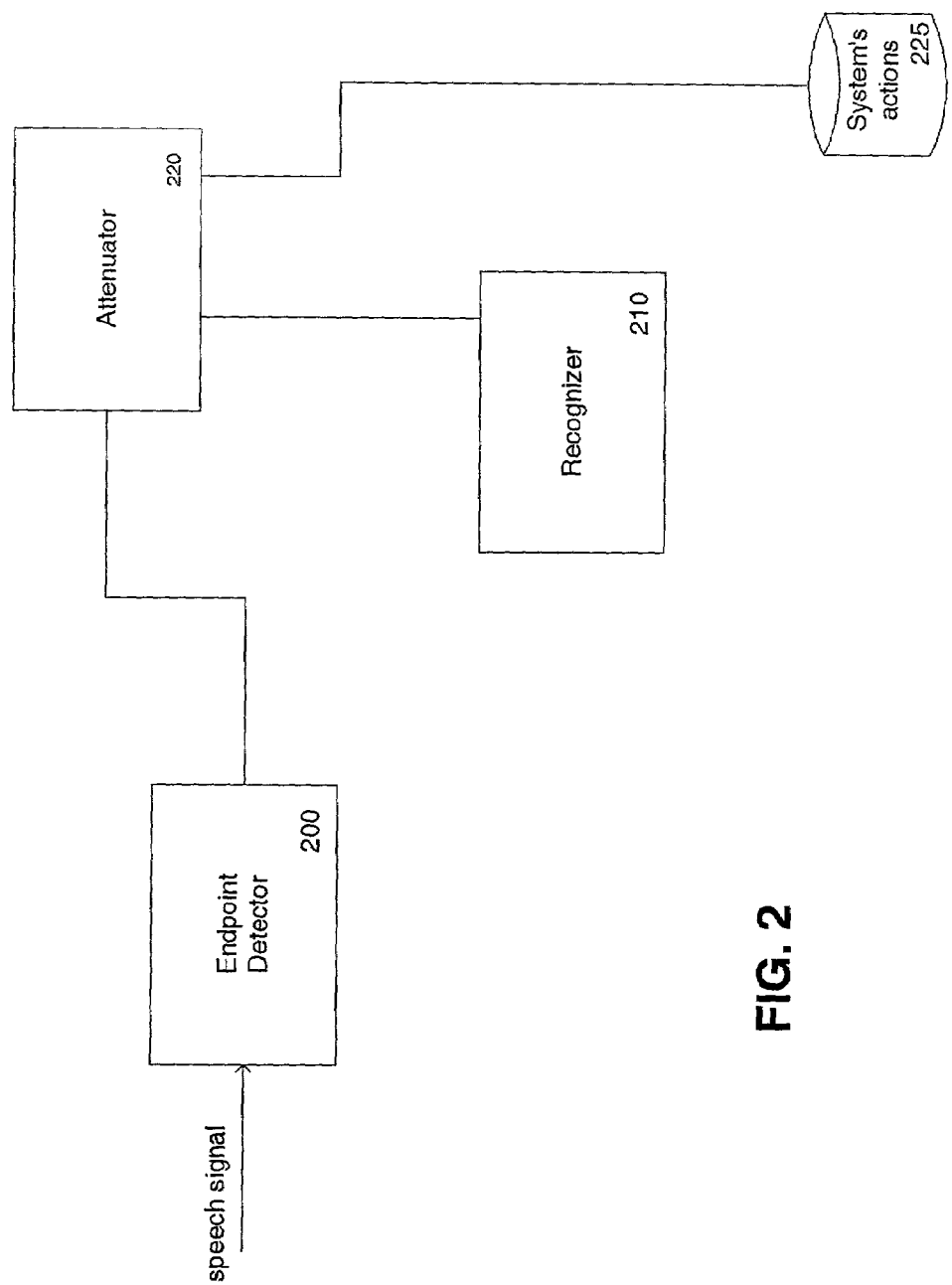
FIG. 2 illustrates components of a speech recognition system according to one embodiment of the present invention.
Figure 3:
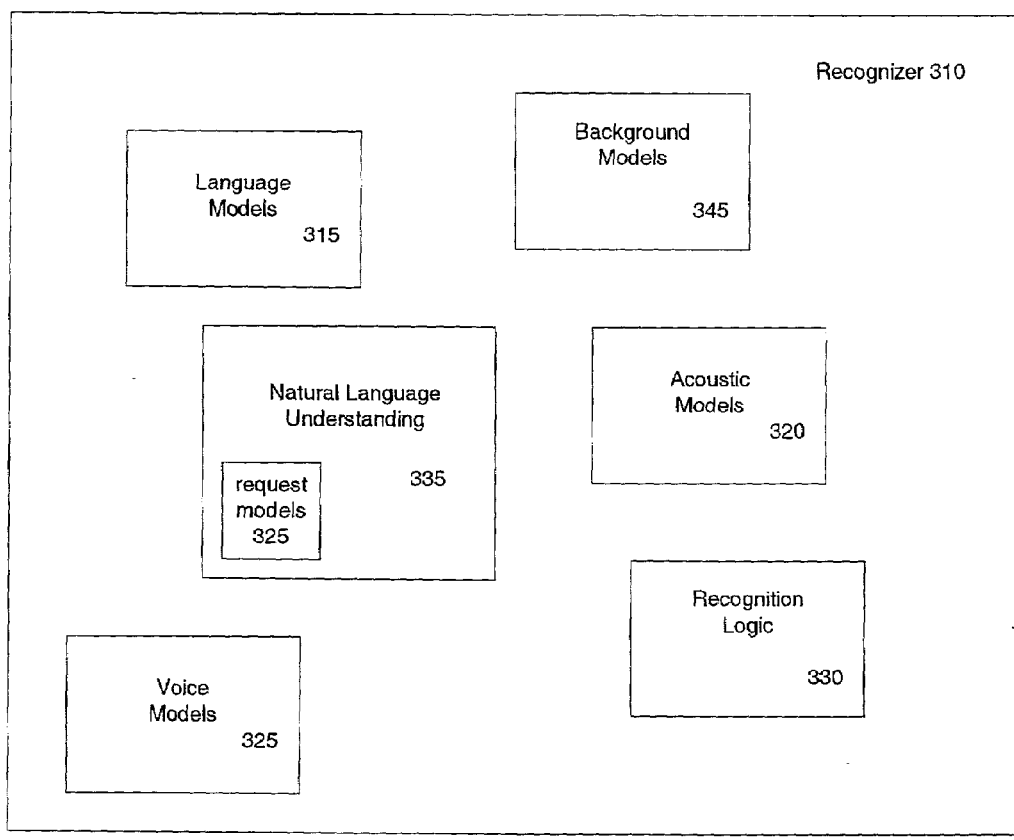
FIG. 3 illustrates components of a recognizer of the speech recognition system according to one embodiment of the present invention.

FIG. 2 illustrates components of the speech recognition system 125 relating to the barge-in feature. It will be appreciated that the speech recognition system 125 may comprise additional components well known in the art. The system includes an endpoint detector 200 to receive a speech signal transmitted from a connecting device and a recognizer 210 to determine the meaning of an utterance retrieved from the speech signal. As shown in FIG. 3, the recognizer 210 comprises a set of natural language models 315, a set of acoustic models 320, a set of voice models 325, a set of request models 335, background models 340 and a recognition logic 330 as illustrated in FIG. 3. The acoustic models 320 are statistical representations of all phonetic units and subunits of speech that may be found in a speech waveform. The language models 315 are statistical or deterministic representations of all possible words and all possible combinations of word sequences that are allowed by the speech recognition system 125. Natural Language Understanding (NLU) determines the meaning associated with the recognized sequence of words for the given dialog state. This association can be deterministic or statistical. The voice models 325 are a collection of voice samples of users of the speech recognition system 125. The background models 330 are a collection of possible background noises that may be present in a signal received by the speech recognition system 125. The functions of these components will be described in greater detail below.

Figure 4:
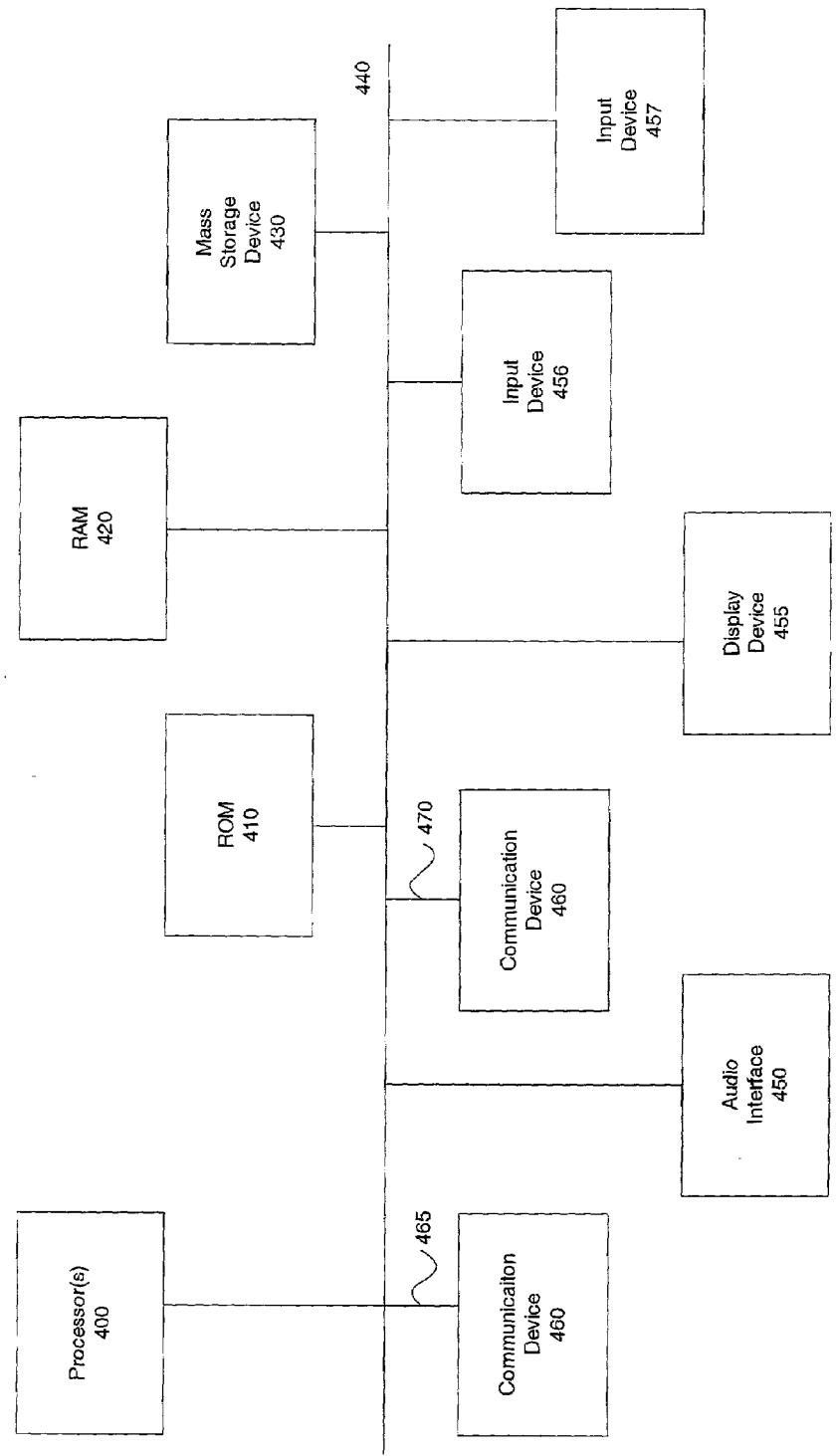
FIG. 4 illustrates a processing system according to one embodiment of the present invention.

The speech recognition system may be implemented in a conventional processing system, such as a personal computer (PC), server-class computer, workstation, hand-held computing device, etc. Alternatively, the system may be distributed between two or more such processing systems, which may be connected on a network. FIG. 4 is a high-level block diagram of an example of such a processing system The processing system of FIG. 4 may include one or more processors 400, read-only memory (ROM) 410, random access memory (RAM) 420, and a mass storage device 430 coupled to each other on a bus system 440. The bus system 440 may include one or more buses connected to each other through various bridges, controllers and/or adapters, which are well known in the art. For example, the bus system 440 may include a 'system bus', which may be connected through an adapter to one or more expansion busses, such as a peripheral component interconnect (PCI) bus or an extended industry standard architecture (EISA) bus. Also coupled to the bus system 440 may be one or more data communication devices 460 to communicate with remote processing systems via one or more communication links 465 and 470, respectively.

Also coupled to the bus system 440 are an audio interface 450, a display device 455 and input devices 456 and 457. The audio interface 450 allows the computer system to receive an input audio signal that includes the speech signal. The audio interface 450 includes circuitry and (in some embodiments) software instruction fro receiving an input audio signal which includes the speech signal, which may be received from a microphone, a telephone line, a network interface (e.g., via a communication device 460), etc., and for transferring such signal onto the bus system 440. The display device 455 may be any suitable device for displaying alphanumeric, graphical and/or video data to a user, such as a cathode ray tube (CRT), a liquid crystal display (LCD), or the like, and associated controllers. The input devices 456 and 457 may include, for example, a conventional pointing device, a keyboard, etc.

The data communication device(s) 460 each may be any devices suitable for enabling the processing system to communicate data with a remote processing system over a data communication link, such as a wireless transceiver or a conventional telephone modem, a wireless modem, an Integrated Services Digital Network (ISDN) adapter, a Digital Subscriber Line (DSL) modem, a cable modem, a satellite transceiver, an Ethernet adapter, or the like. At least one of communication links may be a wireless link, to provide communication between mobile devices and a wireless network.

The processor(s) 400 may include one or more conventional general-purpose or special-purpose programmable microprocessors, digital signal processors (DSPs), application specific integrated circuits (ASICs), or programmable logic devices (PLD), or a combination of such devices. The mass storage device 430 may include any one or more devices suitable for storing large volumes of data in a non-volatile manner, such as magnetic disk or tape, magneto-optical storage device, or any of various types of Digital Video Disk (DVD) or Compact Disk (CD) based storage or a combination of such devices.

Note that some of these components may be omitted in certain embodiments, and certain embodiments may include additional or substitute components that are not mentioned here. Such variations will be readily apparent to those skilled in the art. As an example of such a variation, the functions of the audio interface 450 and the communication devices 460 may be provided in a single device. As another example, the peripheral components connected to the bus system 440 might further include audio speakers and associated adapter circuitry. As yet another example, the display device 455 may be omitted if the processing system requires no direct visual interface to a user.

Methodology

Figure 5A:
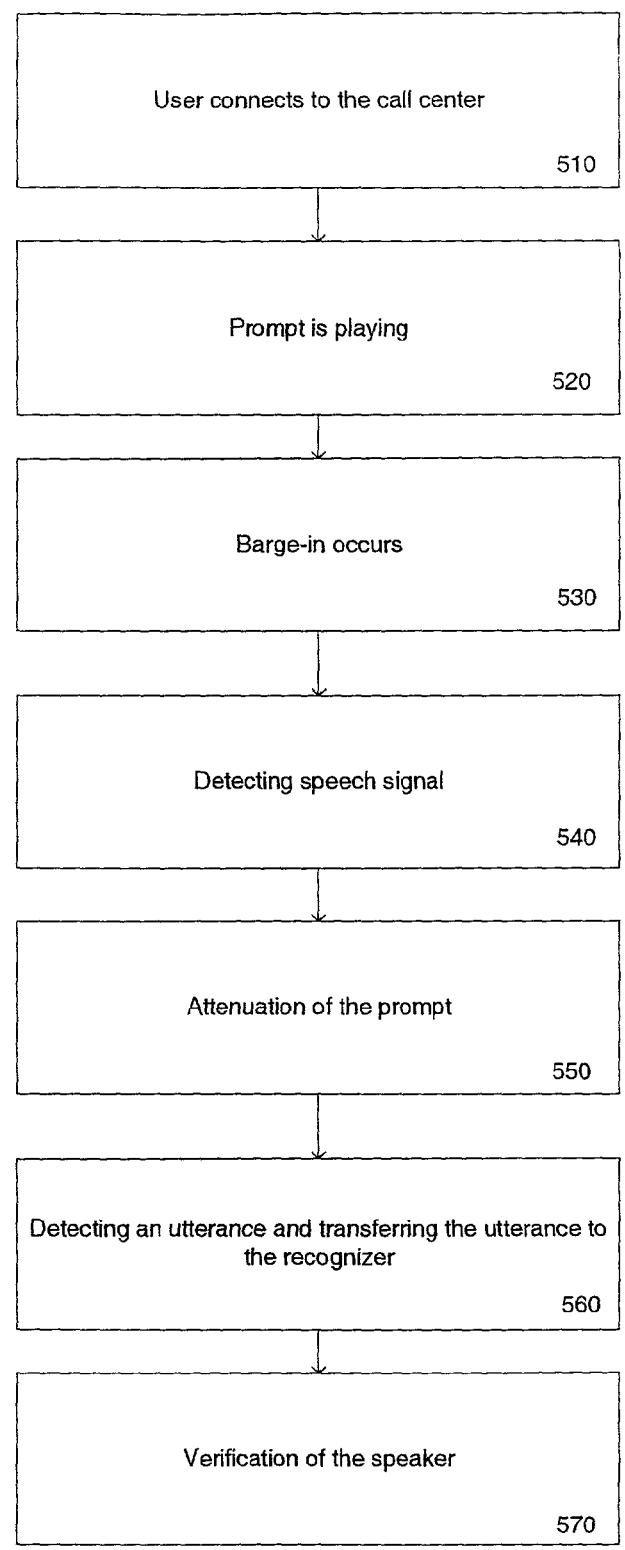
FIG. 5A is a flow diagram showing a process of determining whether to accept or reject a barge-in according to one embodiment of the present invention.

With these concepts in mind an embodiment of the present invention can be further explored. FIG. 5A is a flow diagram showing a process of determining whether to accept or reject a barge-in. At 510 of FIG. 5A a user of the call center 120 connects to the call center 120 via the network 115, for example, by dialing a predetermined phone number. Upon connecting to the call center 120, the speech recognition system 125 prompts the user for an action by playing a prompt at 520. For example, if the speech recognition system 125 is an automated banking service provided by a particular bank, the system may prompt the user for a bank account number.

At 530 barge-in occurs, e.g., the user starts speaking his/her bank account number prior to the end of prompt playing. At 540 the endpoint detector 200 of FIG. 2 detects the speech signal caused by the user speaking his/her bank account number. Upon the detection of the user's speech, the attenuator 220 at 550 attenuates the prompt in order to inform the user that his/her speech was acknowledged. At 560 the endpointer starts transferring the utterance extracted from the speech signal to the recognizer 210 of FIG. 210 when the beginning of the utterance is detected. It continues transferring it until the end is detected. At 570 of FIG. 5A the recognizer 210 verifies the identity of the speaker by comparing the utterance to a voice model of the caller stored in a voice model database 325, and to a generic model of all voices. If the utterance matches the voice model better than the generic model of all voices (by more than a threshold), then the identity of the speaker is verified. The verification process is well known in the art and does not require detailed explanation.

Figure 5B:
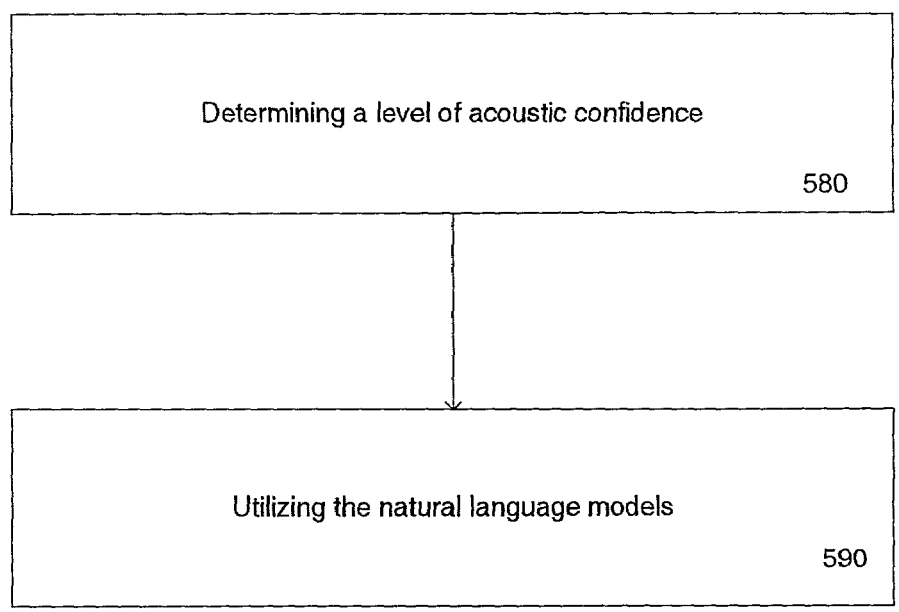
FIG. 5B is a flow diagram showing a process of determining whether to accept or reject a barge-in according to one embodiment of the present invention.

At 580 of FIG. 5B the recognition logic 330 of the recognizer 210 determines a level of acoustic confidence by matching the detected utterance to the acoustic models 320 of FIG. 3. If the components of the utterance, i.e. frames that may be short segments of the speech waveform, usually 10–30 milliseconds, do not match the acoustic models and thus the level of acoustic confidence is low, the recognizer 210 at 575 rejects the user's speech and directs the attenuator 220 to intensify the prompt, i.e. bring the volume of the prompt back to default level, and re-starts recognition if the prompt is still playing. In one embodiment if the prompt has finished by the time the user's speech is rejected, then the recognition system proceeds to the next dialog state. For example, if the user attempts to access his/her checking account by saying "Checking" in response to a prompt "What account would you like to access: checking account or savings account?", the recognizer 210 determines whether the user's response, "checking" matches an acoustic model for the word "checking" or "savings". In one embodiment the level of acoustic confidence is satisfactory if it is greater than a confidence threshold maintained by the recognizer 210.

Figure 6:
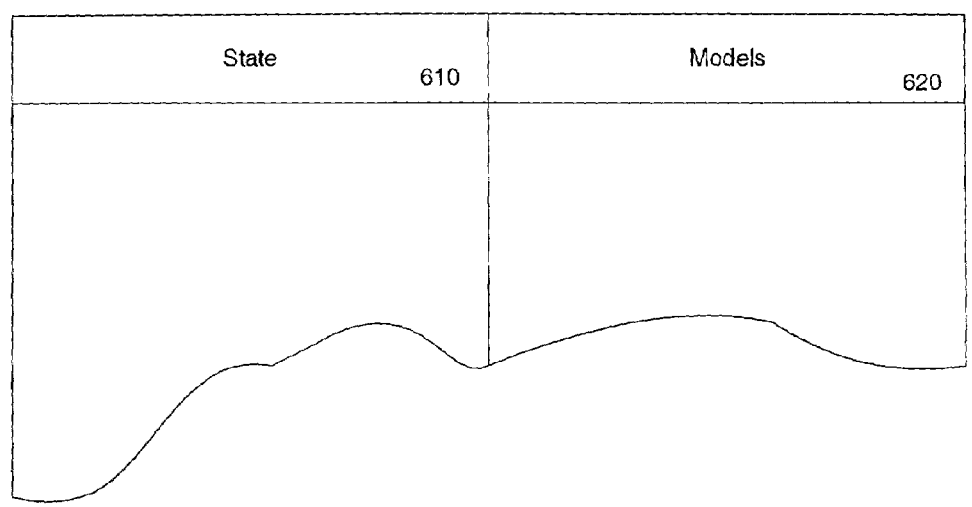
FIG. 6 illustrates a format of a table to store natural language models according to one embodiment of the present invention.
Figure 9:
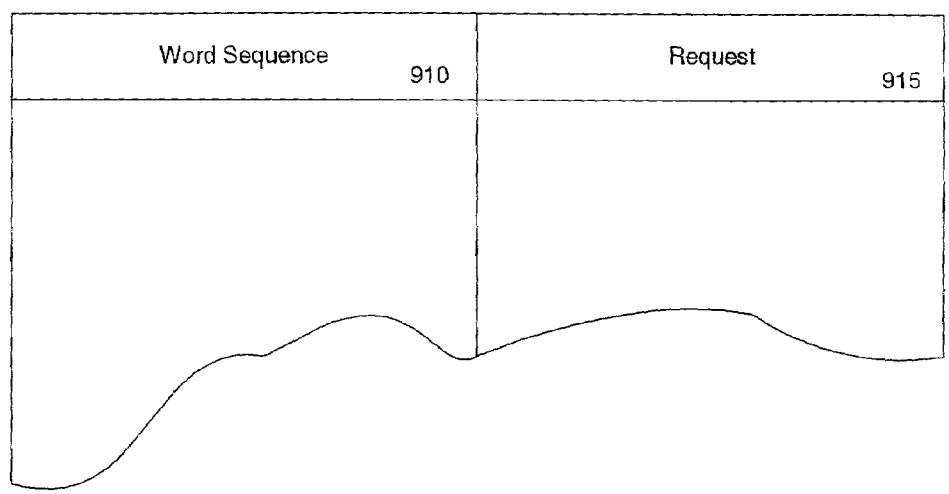
FIG. 9 illustrates a format of a request models table.

If the user's utterance matches an acoustic model, the speech recognition system determines whether the sequence of words correlates to a sequence of possible words maintained in the language models 315. In one embodiment the language models 315 are stored according to dialog states of the speech recognition system 125. FIG. 6 illustrates a format of a table that may contain the natural language models 315. The models field 620 comprises natural language models for user responses allowed in a particular speech recognitions system 125 state. For example, if the current state of the speech recognition system 125 is prompting the user for a bank account number and the user's utterance does not include any digits and is related to completely unrelated subject matter, then the recognizer 210 rejects the user's speech, i.e. rejects the barge-in, and directs the attenuator 220 to intensify the prompt to the default level and re-starts recognition if the prompt is still playing. Thus, in one embodiment, if the speech does not correspond to an allowable response, and the prompt is still playing then the prompt level is brought back to its original level and recognition is automatically re-started. If the prompt has finished by the time the utterance is rejected, then the recognition system proceeds to the next dialog state. If the user's utterance correlates to a language model corresponding to a particular dialog state, the natural language understanding 335 translates the user's utterance in order to determine whether the sequence of words correlates to a possible meaning for the current state of the speech recognition system 125. For example, if the user's utterance comprises a sequence of words "big blue" and this sequence corresponds to a language model allowed for the current dialog state, the natural language understanding 335 determines the meaning of the utterance by translating "big blue" into a quote lookup request for the company with a ticker symbol "IBM" utilizing entries in the request models table 336, the format of which is illustrated in FIG. 9. The table comprises user requests in a request field 915 that correspond to word sequences recognizable by the speech recognition system stored in the field word sequence 910. Continuing with the example presented above, the request models table comprises "big blue" word sequence in the word sequence field 910 and a corresponding request to lookup a quote for the company with a ticker symbol "IBM" in the request field 915. It will be appreciated that determining meaning of a word sequence is well known in the art and does not require any further explanation. If the user's utterance correlates to the current state of the speech recognition system and the meaning of the utterance corresponds to the recognizable requests, the barge-in is accepted by the recognizer 210 and the recognizer 210 directs the attenuator 220 to terminate the current prompt.

In one embodiment of the present invention the verification of the speaker, determination of acoustic confidence and utilization of natural language models are employed in an alternative in order to determine whether to accept or reject the barge in. For example, the speech recognition system may only determine a level of acoustic confidence in order to decide whether to accept the detected barge-in without verifying the speaker's identity and without determining the meaning of the detected utterance. In an alternative, the speech recognition system may accept the barge-in upon successful verification of the speaker's identity without determining the level of acoustic confidence or the meaning of the utterance. Yet, in another embodiment, the speech recognition system may accept or deny the barge upon determining the meaning of the detected utterance without verifying the speaker's identity or determining the level of acoustic confidence.

Figure 7A:
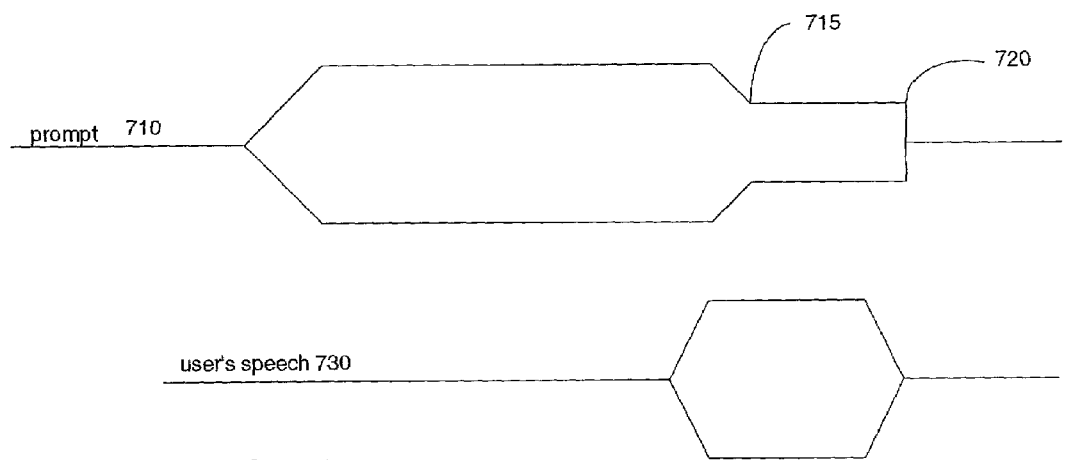
FIG. 7A is a diagram illustrating acceptance of user's barge-in according to one embodiment of the present invention.
Figure 7B:
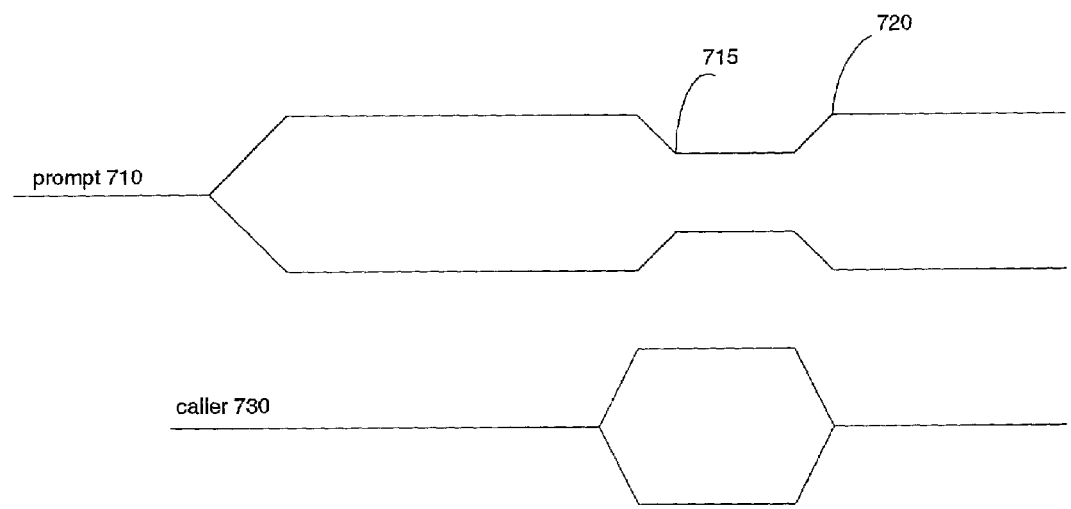
FIG. 7B is a diagram illustrating rejection of user's barge-in according to one embodiment of the present invention.

FIGS. 7A and 7B are diagrams illustrating the relationship between the prompt playing and the user's speech. FIG. 7A illustrates an embodiment where the user's speech 710, barge-in, caused the attenuation of the prompt at 715, and upon acceptance by the recognizer 210, the attenuator 220 is directed to terminate the prompt at 720. FIG. 7B illustrates an embodiment where the user's speech is rejected, either due to lack of an acoustic match with a particular level of confidence, or lack of the user's utterance correlating to a state of the speech recognition system 225. Upon the endpoint detector 200 detecting the speech, the prompt is attenuated at 715 by the attenuator 220. When the recognizer 210 determines that the utterance either does not correspond to the system's state or does not match any of the acoustic models or the user's voice is not successfully verified, the recognizer directs the attenuator to increase the prompt back to the original level and the user's speech is ignored at 720, i.e. barge-in is rejected, and recognition is re-started if the prompt is still playing.

Figure 8:
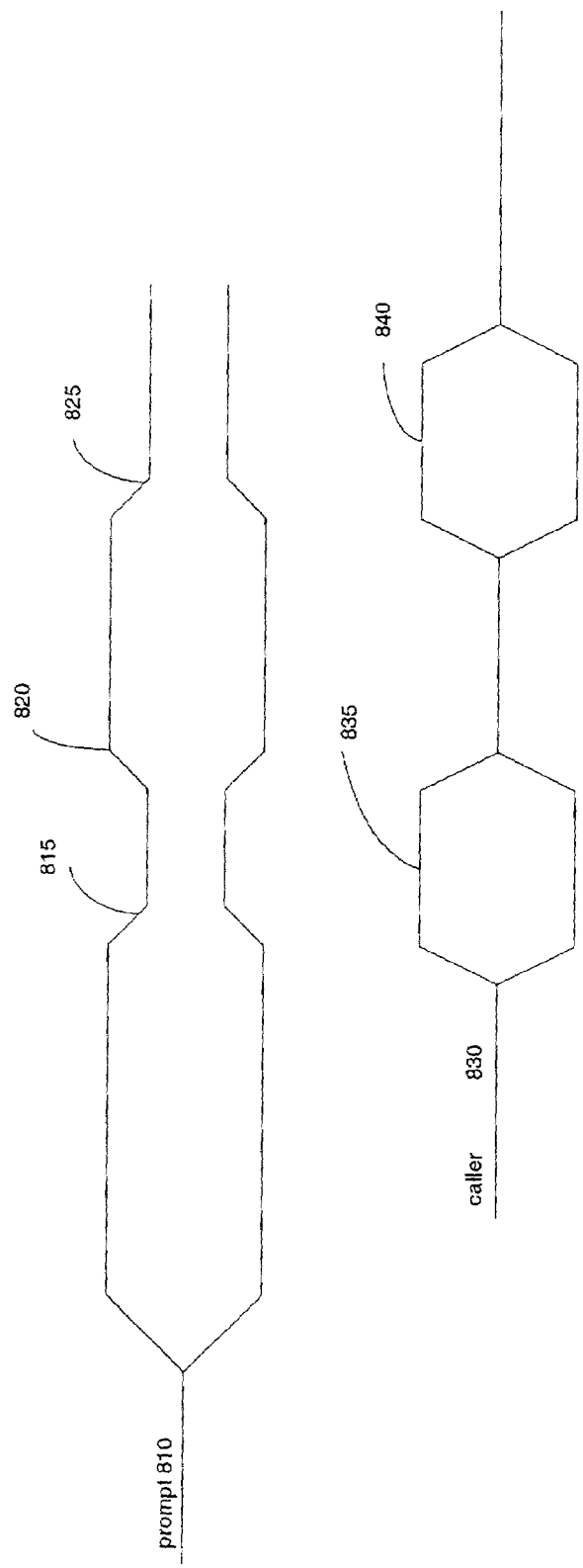
FIG. 8 is a diagram illustrating rejection of first user's barge-in according to one embodiment of the present invention.

In one embodiment of the present invention, the level of the attenuation depends on the previous actions of the speech recognition system 125. FIG. 8 illustrates a rejection of a first user's utterance. Upon detection of the utterance 835 by the endpoint detector 200, the endpoint detector 200 directs the attenuator 220 to attenuate the prompt 810 at 815 in order to inform the user that his/her speech was acknowledged. At the same time the endpoint detector 200 transmits the detected utterance to the recognizer 210. Upon receipt of the utterance, the recognizer 210 verifies the user's identity, matches the utterance 835 to the acoustic models and determines whether the utterance correlates to a current state of the speech recognition system. If one of these three processes fails, the utterance is ignored and the recognizer 210 directs the attenuator 220 to intensify the prompt and recognition is re-started if the prompt is still playing. Upon the endpoint detector 200 detecting the second user's utterance at 840, the endpoint detector 200 directs the attenuator 220 to attenuate the prompt 810 at 825. The attenuator 220 accesses the system's actions database 225 illustrated in FIG. 2 to determine whether the previous utterance during the same session was rejected by the recognizer 210. If the previous utterance made by the user during the same session was rejected, then the attenuator 220 attenuates the prompt to a level higher than the level used in the first prompt attenuation.

In one embodiment of the present invention, the endpoint detector 200 can transmit the entire signal to the recognizer 210 for detection of the speech and utterances in order to reduce errors in utterance detection. The switching between the endpoint detector 200 and the recognizer 210 detecting the speech and utterances is performed dynamically in order to effectively determine the user's request. For example, the speech signal may comprise background noise due to the user speaking into the connecting device while located in a noisy environment, such as a car including several people conversing at the same time. In such a case, the endpointer detector, upon detecting a high probability of noise in the signal, transfers the entire signal to the recognizer 210. In one embodiment detection of a high probability of noise is based on the energy-level and other signal characteristics at the beginning of the recognition state, and is well known in the art. The recognizer 210 detects speech and utterances in the received signal by dynamically utilizing natural language models 315 and background models 340 in order to distinguish between the utterance and the background noise. Upon detecting an utterance the recognizer analyzes the utterance in a manner described above. In the embodiment just described, the endpoint detector 200 dynamically determines whether to transmit the entire speech signal or just the detected utterance to the recognizer 210 by evaluating a level of noise in the signal. In addition, in the beginning of a call session, the endpoint detector 200 may transmit the entire speech signal to the recognizer 210.

Many of the features and techniques described above may be implemented in software. For example, the described operations may be carried out in the speech recognition system 125 or other suitable device in response to its processor(s) executing sequences of instructions contained in memory of the device. The instructions may be executed from a memory such as RAM and may be loaded from a persistent store, such as a mass storage device, and/or from one or more other remote processing systems. Likewise, hardwired circuitry may be used in place of software, or in combination with software, to implement the features described herein. Thus, the present invention is not limited to any specific combination of hardware circuitry and software, nor to any particular source of software executed by the processing systems.

Thus, a method and apparatus for barge-in acknowledgement are disclosed. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative sense rather than a restrictive sense.

What is claimed is:

1. A method comprising:
    playing a prompt at a first level to a user of a speech recognition system;
    attenuating the prompt without terminating the prompt, in response to detecting a speech signal during playing of the prompt;
    extracting an utterance from the speech signal;
    determining whether the utterance corresponds to an allowable response by verifying the user by comparing the utterance to a plurality of voice samples, determining a level of acoustic confidence, and determining whether a meaning of the utterance correlates to the prompt;
    if the utterance corresponds to the allowable response, then accepting the utterance and terminating the prompt; and
    if the utterance does not correspond to the allowable response, then rejecting the utterance and intensifying the prompt.

2. The method of claim 1 wherein the determining the level of acoustic confidence comprises matching the utterance to acoustic samples.

3. The method of claim 1 wherein the determining whether the meaning of the utterance correlates to the prompt comprises matching the utterance to natural language samples.

4. The method of claim 1, wherein:
    said attenuating the prompt comprises attenuating the prompt to a second level in response to detecting first speech during playing of the prompt; and
    the method further comprises:
    attenuating the prompt to a third level in response to detecting second speech during playing of the prompt, wherein the second level is higher than the first level.

5. The method of claim 4, further comprising:
    determining whether a previous utterance was rejected;
    wherein said attenuating the prompt to a third level is in response to determining that the previous utterance was rejected.

6. A method comprising:
    playing a prompt at a default level to a user of a speech recognition system;
    attenuating the prompt without terminating the prompt, in response to detecting a speech signal occurring during playing of the prompt;
    extracting an utterance from the speech signal;
    determining whether the utterance corresponds to an allowable response by performing a single operation from a set of operations;
    if the utterance corresponds to the allowable response, then accepting the utterance and terminating the prompt; and
    if the utterance does not correspond to the allowable response, then rejecting the utterance and intensifying the prompt.

7. The method of claim 6 wherein the set of operations comprises verifying the user by comparing the utterance to a plurality of voice samples operation, determining a level of acoustic confidence operation and determining whether a meaning of the utterance correlates to the prompt operation.

8. The method of claim 7 wherein the determining the level of acoustic confidence operation comprises matching the utterance to acoustic samples.

9. The method of claim 7 wherein the determining whether the meaning of the utterance correlates to the prompt operation comprises matching the utterance to natural language samples.

10. The method of claim 9 wherein the matching the utterance to the natural language samples comprises determining a request corresponding to matching natural language samples.

11. A method comprising:
   attenuating a prompt to a first level without terminating the prompt, in response to detecting a first speech signal during playing of the prompt at a default level;
   intensifying the prompt in response to determining that an utterance extracted from the first speech signal does not correspond to an allowed response; and
   attenuating the prompt to a second level in response to detecting a second speech signal during playing of the prompt at the default level, wherein the second level is higher than the first level.

12. The method of claim 11 wherein the utterance does not correspond to the allowed response if a sample of the utterance does not match a voice sample from a plurality of voice samples.

13. The method of claim 11 wherein the utterance does not correspond to the allowed responses if the utterance does not match acoustic models.

14. The method of claim 11 wherein the utterance does not correspond to the allowed response if a meaning of the utterance does not correlate to a meaning of the prompt.

15. The method of claim 14 wherein the meaning of the utterance does not correlate to the meaning of the prompt if the utterance does not match natural language models.

16. The method of claim 11, wherein said attenuating the prompt to a second level is in response to determining that the previous utterance was rejected.

17. A speech recognition system comprising:
   means for attenuating a prompt to a first level without terminating the prompt, in response to detecting a first speech signal during playing of the prompt at a default level;
   means for intensifying the prompt to the default level in response to determining that an utterance extracted from the first speech signal does not correspond to an allowed response; and
   means for attenuating the prompt to a second level in response to detecting a second speech signal during playing of the prompt at the default level, the second level is higher than the first level.

18. The speech recognition system of claim 17 wherein the utterance does not correspond to the allowed response if a sample of the utterance does not match a voice sample from a plurality of voice samples.

19. The speech recognition system of claim 17 wherein the utterance does not correspond to the allowed response if the utterance does not match acoustic models.

20. The speech recognition system of claim 17 wherein the utterance does not correspond to the allowed response if a meaning of the utterance does not correlate to a meaning of the prompt.

* * * * *